United States Patent [19]

Okouchi et al.

[11] Patent Number: 4,597,871
[45] Date of Patent: Jul. 1, 1986

[54] APPARATUS FOR REMOVING FOREIGN MATTERS

[75] Inventors: Isao Okouchi; Kenkichi Izumi; Sankichi Takahashi; Yasuteru Mukai; Akira Tomida, all of Ibaraki, Japan

[73] Assignee: Hitachi, Ltd., Tokyo, Japan

[21] Appl. No.: 614,666

[22] Filed: May 29, 1984

Related U.S. Application Data

[63] Continuation of Ser. No. 150,002, May 15, 1980, abandoned.

[30] Foreign Application Priority Data

May 25, 1979 [JP] Japan .................................. 54-63831

[51] Int. Cl.⁴ ............................................. B01D 21/26
[52] U.S. Cl. .................................... 210/456; 210/512.1
[58] Field of Search ............... 210/304, 405, 409, 456, 210/512.1, 787

[56] References Cited

U.S. PATENT DOCUMENTS

| | | | |
|---|---|---|---|
| 1,175,948 | 3/1916 | French | 210/304 |
| 1,176,732 | 3/1916 | Bowser | 210/304 |
| 2,738,070 | 3/1956 | Cottrell | 210/512.1 |
| 3,067,876 | 12/1962 | Hruby | 210/304 X |
| 3,088,595 | 5/1963 | Robb | 210/304 |
| 3,394,809 | 7/1968 | Hunter | 210/304 X |
| 3,771,290 | 11/1973 | Stethem | 210/304 X |
| 3,776,385 | 12/1973 | Maciula et al. | 210/304 |
| 3,784,009 | 1/1974 | Maciula | 210/304 X |
| 3,802,570 | 4/1974 | Dehne | 210/304 |
| 3,807,568 | 4/1974 | Ruthrof | 210/304 |
| 3,828,930 | 8/1974 | Eimer et al. | 210/405 X |
| 3,875,963 | 4/1975 | Treplin et al. | 210/405 X |
| 4,199,493 | 3/1980 | Tauber | 210/304 X |

Primary Examiner—Thomas Wyse
Attorney, Agent, or Firm—Antonelli, Terry & Wands

[57] ABSTRACT

Apparatus for removing foreign matter in liquid which includes a cylindrical housing, a radial inlet pipe provided on an upper portion of the housing, an outlet pipe axially mounted on the housing at the upper portion, a conical cylindrical filter disposed in the housing and connected to the end of the outlet pipe so as to discharge the liquid from the inlet pipe through said filter and the outlet pipe, a deflector for deflecting the liquid from the inlet pipe so as to swirl it round the filter, and an extracting pipe provided on the housing at the bottom portion. The filter extends conically from the inlet pipe or outlet pipe toward the bottom of the casing. The liquid from the inlet pipe is swirled by the operation of the deflector and directed downward by the position of the filter while swirling. The foreign matter in the liquid and deposited on the filter are swirled by the swirling liquid, condensed by centrifugal force and downward movement. The condensed foreign matters are extracted by an opening up of the extracting pipe.

3 Claims, 4 Drawing Figures

APPARATUS FOR REMOVING FOREIGN MATTERS

This is a continuation of application Ser. No. 150,002 filed May 15, 1980, now abandoned.

BACKGROUND OF THE INVENTION

This invention relates to apparatus for removing foreign matters in liquid, and more particularly to apparatus for removing foreign matters such as marine organisms from cooling seawater used in a condenser etc. of a cooling seawater system.

Seawater is sometimes employed as cooling water for condensers in thermal and nuclear power stations etc., and the inflow of marine organisms etc. into the cooling seawater has heretofore been prevented by means of a screen disposed at a seawater intake, and so on. However, marine organisms etc. which breed in a waterway behind the screen or a piping system are introduced into the water chamber of the condenser by a water current and block the inlet part of a cooling pipe, or they accumulate in the pipe to such an extent so as to reduce the quantity of the cooling water. Moreover, the marine or organisms or the like may even cause leakage due to the erosion and the corrosion pitting of the pipe material. It is also a cause for the frequent occurrence of the above troubles that, although chlorine had been injected into the seawater for suppressing adhesion or growth of organisms such as shells, the chlorine injection process has been stopped for the reason of such adverse influence as destroying beneficial marine organisms.

There has been known a technique wherein, in order to prevent such drawbacks, a filter is disposed in the cooling water inlet pipe of the condenser to remove foreign matters such as marine organisms from the system before the cooling water flows into the water chamber. This kind of apparatus is shown in U.S. Pat. Nos. 3,875,063, and 3,828,930 wherein a cylindrical housing and a cylindrical filter disposed coaxially therein define an annular space therebetween, and the housing is provided with a radial inlet pipe at the upper portion of the filter, and an outlet pipe arranged axially of the filter at the lower portion. By deflector means provided in the radial inlet pipe swirling fluid flow is formed around the filter. It seems that since the swirling fluid flow decreases in its velocity toward the outlet pipe and the fluid in the annular space flows into the filter, there are fluid flows carrying solids to be separated near the outlet pipe so that the filter may be clogged near the outlet pipe and a practical filtering face is reduced. In both of these apparatus it is required that, during foreign matter extracting operations, the quantity of extracted water is small; a rise in the pressure loss due to the installation of the apparatus is low; and a clogging of a strainer does not occur.

More particularly, when the foreign matters are extracted, the cooling seawater is simultaneously extracted. Therefore, decreasing the quantity of the cooling water to the minimum is necessary for maintaining the performance of a condenser. In addition, the pressure loss corresponding to a water current resistance is incurred by the installation of such apparatus in the piping system. The increase thereof results in an increase in the pumping power of the cooling water, and therefore needs to be suppressed. Further, the clogging of the filter surface due to the foreign matters needs to be avoided because such clogging results in an abnormal rise in the pressure loss.

Apparatus for removing foreign matters meeting the above requirements are desired.

SUMMARY OF THE INVENTION

An object of the invention is to provide foreign matter removing apparatus which effectively removes foreign matters without clogging a filter.

Another object of the invention is to provide foreign matter removing apparatus which grasps and removes foreign matters such as marine organisms existant in cooling seawater, within water current, without rising pressure loss of the water current.

A further object of the invention is to provide foreign matter removing apparatus which removes foreign matters in liquid current while preventing a filter from being clogged, with a relatively small amount of liquid being extracted.

Briefly stated, the invention resides in providing an apparatus wherein a liquid carrying foreign matters directed to a filter surface and is swirled around the filter, with the foreign matters being moved in the direction opposite to that of an outlet liquid current of the filter thereby preventing clogging of the filter and a rise in the pressure loss.

DESCRIPTION OF THE PREFERRED EMBODIMENTS

Figure 1:
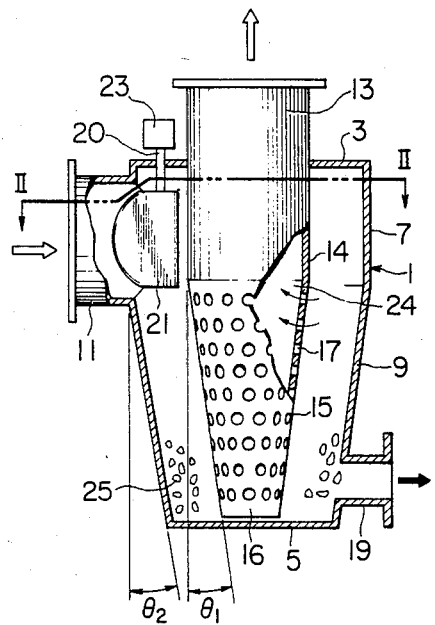
FIG. 1 is a front partial cross sectional view of an embodiment of foreign matter removing apparatus according to the invention.
Figure 2:
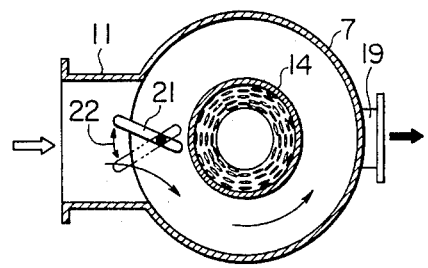
FIG. 2 is a cross sectional view taken along a line II—II of FIG. 1.

Referring now to the drawings and, more particularly, to FIGS. 1 and 2, according to these figures, a foreign matter apparatus used, for example, for removing foreign matter such as marine organisms from cooling sea water used in a condenser, etc. of a cooling sea water system includes a cylindrical casing generally designated by the reference numeral 1 with an upper end plate 3 and a lower end plate 5 for forming a closed housing. The casing 1 has a straight cylindrical upper portion 7 and a conically extending lower portion 9. An inlet pipe 11 is joined to the casing 1 on the straight cylindrical upper portion 7 for introducing seawater into the casing 1 with the inlet pipe 11 extending radially outwardly from the casing 1. An outlet pipe 13 is mounted on the upper end plate 3, with a center axis of the outlet pipe 13 being coaxial with a center axis of the casing 1 and one end 14 of the outlet pipe 13 projecting into the casing 1. A filter 15, formed in a conical shape with an inclination angle $\theta_1$ is mounted on the end 14 of the outlet pipe 13. The filter 15 has a plurality of fine holes 17 on the conical face and a lower end facing the lower end plate 5 with a small gap therebetween. The holes 17 are smaller than a diameter of a cooling pipe of a condenser (not shown), but they may be mesh smaller than the diameter of the cooling pipe. An extraction pipe 19 is mounted on the conically extending lower portion 9 of the casing 1 near the end portion 16 of the filter 15. A plate deflector 21 is provided in a liquid flow from the inlet pipe 11 and is rigidly connected to a shaft 20 so as to be operated by a driving device 23 disposed outside of the casing 1.

The angle $\theta_1$ of the conical face of the filter 15 is at least 5°, and the conically extending lower portion 9 of the casing 1 is inclined at an angle $\theta_2$ of about the same angle as that of the filter 15, so that an annular liquid passage formed between the casing 1 and the filter 15 joined to the inlet pipe 13. The annular liquid passage is reduced in its sectional area in a plane perpendicular to the axis of the casing from the upper end 24 of the casing toward the lower end portion 16.

In the above construction, inside the casing 1, a cylindrical passage having no filter surface is formed on the liquid inflow side in the upper portion, while a conical and annular passage is formed between the casing 1 and the filter 15 in the lower portion.

The foreign matter removing apparatus according to this invention operates in the following manner:

With the deflector 21 located in a state parallel to the center axis of the inlet pipe 11 without being turned, the liquid flowing in from the inlet pipe 11 bends and flows downwards along the outer surfaces of the outlet pipe 13 and the filter 15, and the liquid current having passed through the holes 17 moves upwards oppositely and reaches the outlet pipe 13. The foreign matters such as marine organisms are seized by the filter 15. Accordingly, when the apparatus is allowed to stand as it is, the filter 15 is naturally clogged with the foreign matters to bring about a rise in the differential pressure upstream and downstream of it.

Subsequently, as shown in FIG. 2, the deflector 21 is turned in either direction and is set at a certain angle to the center axis of the inlet pipe 11 so that the inflowing liquid changes its flow direction along the deflector 21, and it swirls and flows along the outer wall of the outlet pipe 13 disposed within the apparatus. An effective swirling stream is produced by actuating the deflector 21 and subjecting the liquid to an approach run by means of the annular liquid passage formed by the casing 1 and the outlet pipe 13. The liquid flowing down while swirling round the filter 15 flows into the filter 15 through the holes 17, and it changes its flow direction and flows out into the outlet pipe 13. The foreign matters enter from the inlet pipe 11 along with the liquid current, descend in the conical annular passage along with the swirling stream, gather in the lower part of the casing 1 as shown by foreign matter 25 in FIG. 1, and revolve together with the liquid current. Accordingly, the foreign matter 25 can be quickly discharged from the extracting pipe 19 by opening the extracting pipe 19. More specifically, by properly selecting $\theta_1$ and $\theta_2$ of the filter 15 and the casing 1, for example at least 5°, the foreign matter 25 can be caused to stay in a concentrated condition in the lower portion of the casing 1. In other words, a part in which no foreign matter 25 exists in a surface of the filter 15 outside the concentrating part (in FIG. 1, the side of the filter 15 connected to the outlet pipe 13) can be formed. This is based on the function that the foreign matter 25 moves towards the concentrating part or the filter end portion 16 along the filter surface having the angle $\theta_1$ together with the swirling stream. This fact simultaneously signifies that the liquid current at the filter surface is averaged, with the result that a rise in the flowing pressure loss at the passage through the holes 17 is suppressed. In addition, the function in which the foreign matter 25 moves along the filter surface in the manner described above results in causing the foreign matter 25 to flow towards the extracting pipe 19 more effectively when the extracting pipe 19 has been opened. Therefore, the foreign matter 25 comes away from the filter surface, which is effective to prevent the clogging. Moreover, even when the quantity of extraction is small, the foreign matter 25 can be fully removed. Further, this phenomenon permits, by operation of the deflector 21, a scraping off the foreign matter seized on the filter surface under an irregular state in the foregoing case where the deflector 21 has not been operated, and periodical turning of the deflector 21 as shown by an arrow 22 of FIG. 2 to give rise to the swirling streams both counterclockwise and clockwise. Besides, even when the deflector 21 is operated, the inlet liquid flow can be always kept in the open state, so that safety is ensured without any abnormal pressure rise.

The apparatus according to the invention can be operated such that after the foreign matter 25 is seized without operating the deflector 21, the extraction pipe 19 is opened in response to the differential pressure upstream and downstream of the filter 15. The foreign matter 25 may be removed by operating the deflector 21 to swirl the liquid, such that the deflector 21 is operated in advance, and when a differential pressure to a certain extent has arisen, the extracting pipe 19 is opened to remove the foreign matter 25, or such that the deflector 21 and the extracting pipe 19 are simultaneously operated.

In this apparatus, the inlet pipe 11 is provided near the outlet portion 24 of the filter 15, and most of the filtering face (in which the holes 17 are made) is disposed in the direction opposite to the outlet pipe 13, so that the foreign matters carried by the liquid or water has a flow direction toward the filter end portion 16. About the filter end portion 16, the liquid flow is slower than the outlet portion 24. Therefore, it is difficult for the the foreign matter removed from the surface of the filter 15 to again be deposited on the filter 15. Further, since the filter 15 and the casing 1 have inclination angles $\theta_1$, $\theta_2$ of at least 5°, the centrifugal force can be maintained until the filter end portion 16 without significant losses so that the foreign matter 25 can be concentrated around the filter end portion 16.

Figure 3:
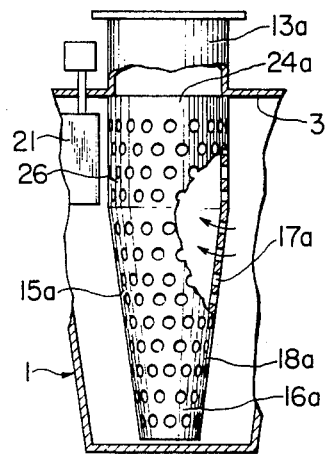
FIG. 3 is a cross sectional view of a modification of a filter used in the apparatus of FIGS. 1 and 2.

FIG. 3 shows a modification of the filter 15 in FIG. 1, wherein a filter 15a comprises a conical portion 18a which is similar to the filter 15, and a cylndrical portion 26. The outlet 24 of the filter 15a faces an upper end plate 3 of a casing 1 which is the same as in FIG. 1 with outlet pipe 13a being provided on the upper end plate 3 facing the upper end portion 24a of the filter 15a so that liquid from the filter 15a can be discharged through the outlet pipe 13a.

In the modification of FIG. 3, swirling and downward movement of the liquid and foreign matter are compared to the apparatus of FIG. 1 reduced, however, the filtering face is enlarged, so that it can be put into practice.

Figure 4:
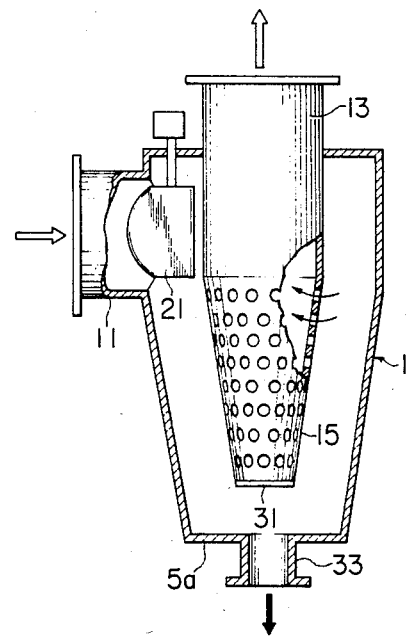
FIG. 4 is a front partial cross sectional view of another embodiment of foreign matter removing apparatus according to the invention.

FIG. 4 shows foreign matter removing apparatus of another embodiment according to this invention, which differs from the embodiment of FIG. 1 in that a larger space is provided between the filter 15 and the bottom of the casing 1. In addition, a lid 31 is disposed at the tip of the filter 15. The lid 31 may well be one provided with apertures. The space permits the concentrating part to shift still below the tip of the casing 1. That is, it permits the foreign matter to come away from the filter 15 and prevent the clogging more effectively. Although, in FIG. 4, the extraction pipe 33 is provided on the lower end plate 5a at the bottom of the casing 1, the effect does not differ at all even when it is located on the side of the casing 1 as shown in FIG. 1.

It is added that the foreign matter apparatus according to this invention is not restricted to the vertical installation as shown in FIGS. 1, 3, and 4 but that even in case of the inverted installation or the lateral installation, the operation and effects above described do not basically vary though the extents somewhat differ depending upon the weights of foreign matter, etc.

According to the embodiments of this invention described above, the following effects may be achieved:

(1) Foreign matter such as marine organisms seized on the filter surface can be effectively removed from within the cooling seawater by the operation of a deflector 21, and the part for concentrating the foreign matters is formed along the filter surface, whereby the removal apparatus free from clogging is provided.

(2) The deflector 21 disposed in a manner to be contained in the apparatus, is manipulated without blocking the waterflow during the operation, and can make the flow at the filter screen uniform and confine the rise of the pressure loss to the minimum.

(3) The conical annular liquid passage is formed by the combined shape of the conical surfaces of $\theta_1$ and $\theta_2$, whereby the clogging of the filter 15, 15a can be perfectly prevented by the swirling stream due to the operation of the deflector 21 and the stream shifting through the liquid passage, and simultaneously, the quantity of extraction during the removing of the foreign matter removing can be made small (at most 10% of the quantity of inlet cooling water was sufficient). p (4) The approach-run liquid passage defined by the casing 1 and the outlet pipe 13 only in FIGS. 1 and 2 promotes the swirling stream, and moreover, since no filter surface confronts the water current flowing in from the inlet pipe 11 at a high flow velocity, foreign matter does not stick into the filter surface.

Accordingly, by installing such apparatus according to this invention on the inlet cooling water system of a heat exchanger such as condenser, foreign matter such as marine organisms can be effectively removed before flowing into the heat exchanger or the like, and a predetermined performance can be maintained.

As a beneficial result according to this invention, it becomes possible to obtain foreign matter removing apparatus which is used for heat exchangers etc. and by which foreign matter such as marine organisms in seawater can be seized and removed within the water current.

What is claimed is:

1. Apparatus for removing foreign matters such as marine organisms in a liquid stream, the apparatus comprising:
   a closed housing having a first end of a larger diameter, a second end of a smaller diameter, and a side wall member with an inner wall of a conical shape gradually decreasing in diameter from around said first end to said second end;
   inlet means disposed near the first end of said housing and extending radially therefrom for introducing the liquid stream into said housing in a radial direction with respect to a center axis of said housing;
   deflector means disposed at said inlet means for swirling the liquid stream in said housing;
   outlet means disposed coaxially with said housing and located at the first end thereof for discharging the liquid stream from said housing after filtration;
   filter means coaxially disposed in said housing and mounted on an end plate of said first end of said housing, said filter means having a conical configuration with a diameter decreasing gradually in a direction toward the second end of said housing at an inclination angle of $\theta_1$, said filter means being arranged in said housing so that an annular liquid passage is defined between the inner wall of said housing and an outer surface of said filter means, said annular liquid passage extending axially from said inlet means to said second end of said housing and being gradually reduced in a cross-sectional area taken along a plane perpendicular to the longitudinal axis of said housing towards the second end so that the liquid stream with the foreign matter can be moved toward the second end of the housing while swirling around said filter means;
   means for adjusting the deflector means so as to change a swirling direction of the liquid stream; and
   extracting means radially provided in said side wall member of said housing near the second end of said housing and communicating with said annular passage for extracting the foreign matter along with part of the liquid.

2. The apparatus according to claim 1, wherein an inclination angle $\theta_2$ of said conical wall of said housing and the inclination angle $\theta_1$ of said filter means are approximately the same and are at least 5°.

3. The apparatus according to claim 1, wherein said annular liquid passage allows a free change in a liquid swirling direction caused by said deflector means in accordance with a movement of said deflector means.

* * * * *